United States Patent [19]

Adams

[11] 4,269,221

[45] May 26, 1981

[54] VALVE STEM LOCK

[76] Inventor: Harold R. Adams, Rte. 1, St. Francisville, Ill. 62460

[21] Appl. No.: 62,710

[22] Filed: Aug. 1, 1979

[51] Int. Cl.[3] ............................................. F16K 35/00
[52] U.S. Cl. ..................................... 137/383; 137/385; 70/179
[58] Field of Search ............................... 137/383, 385; 70/175–180, 183

[56] References Cited

U.S. PATENT DOCUMENTS

| | | | |
|---|---|---|---|
| 1,099,280 | 6/1914 | Connolly | 70/176 |
| 1,432,621 | 10/1922 | Rath | 70/180 |
| 2,077,997 | 4/1937 | Hedene | 70/178 |
| 2,316,956 | 4/1943 | Heath | 70/180 |

FOREIGN PATENT DOCUMENTS 516501 10/1919 France ........................................ 70/183

Primary Examiner—Martin P. Schwadron
Assistant Examiner—A. Michael Chambers
Attorney, Agent, or Firm—Glenn K. Robbins

[57] ABSTRACT

A valve stem lock for valves having an exposed valve stem. The lock is comprised of a pair of hinged sections movable from an open position to a closed position to lock about a valve stem. The two sections are provided with a base having slots which are adapted to bear against exposed bolts or the yoke of the valve stem so that rotation of the valve stem upon removal of a part such as a bushing nut or the like is prevented. The two hinged sections are adapted to be locked together in the closed position.

7 Claims, 3 Drawing Figures 4,269,221

VALVE STEM LOCK

SUMMARY OF THE INVENTION

In the past there has been a problem in the field in the servicing of large industrial valves and the like to provide a simple lock for a valve stem when maintenance is desired to be preformed on the valve. Such valves are conventionally used in industry, including industrial chemical plants, refineries, utilities and the like. The valve may be quite massive and when maintenance is desired to be preformed in the field the valve stems conventionally are desired to be locked in removal of bushing nuts and other parts of the valve apparatus to maintain the valve in the lock and stable position.

By means of this invention there has been provided a simple valve stem lock for valves having a valve yoke or bolts within the yoke a device for locking the valve stem in a position to resist rotation when parts connected to the valve stem are desired to be removed or otherwise serviced. The conventional yoke used in many types of industrial valves makes it quite difficult to lock the valve stem because of difficulty of access due to the blocking by the yoke of the valve stem.

The hinged sections used in this invention make it possible to open the valve lock and close it about the valve stem much in the fashion of opening jaws and closing them. The hinged sections of the valve lock when fitted around the valve stem are adapted to be locked together and fixed upon the valve stem by locking screws which are threaded through a hub to bear against the valve stem. The locking screws may be of brass or other material of less hardness then the valve stem to prevent damage to the valve stem surface.

The lock is comprised of a hub which is hinged and fits in upstanding portion upon a hinged base. The base of both hinged section extend outwardly and is provided with a cut-out or slotted portion which fits within an upstanding portion of the valve such as an exposed bolt or portion of the valve yoke. Thus when the valve is worked upon rotation of the valve stem is prevented by the cut-out slots acting as a stop.

The hinged valve stem lock of this invention is very simply adapted to be used. It is simply placed on top of the packing gland or the like inside the valve yoke and connected in the rotation stopping position and locked in place. The lock can be simply used in the field at modest expense in a very short period of time and serves very efficiently to provide the valve stem locking operation.

The above features are objects of this invention and further objects will appear in the detailed description which follows and will be otherwise apparent to those skilled in the art.

For the purpose of illustration of this invention there is shown in the accompanying drawings a preferred embodiment thereof. It is to be understood that these drawings are for the purpose of illustration only and that the invention is not limited thereto.

IN THE DRAWINGS

DESCRIPTION OF THE INVENTION

Figure 1:
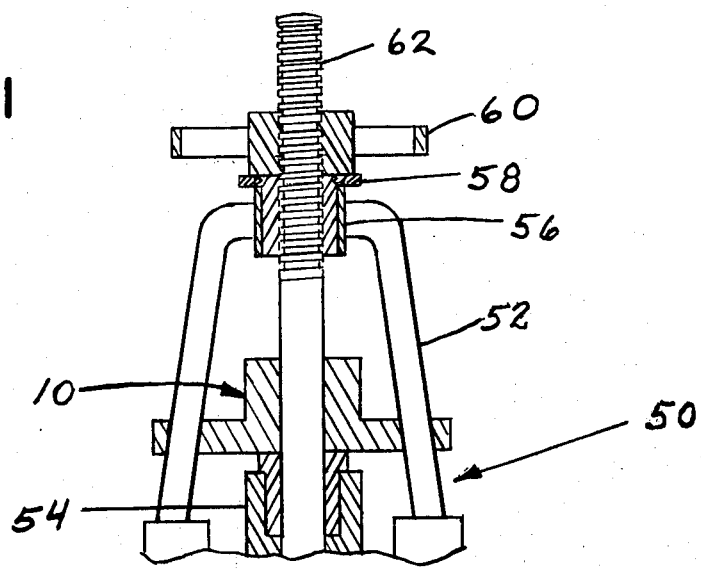
FIG. 1, is a fragmentary view in reduced scale and axial section and in side elevation of the yoke of a valve equipment with the valve stem lock shown in section.
Figure 2:
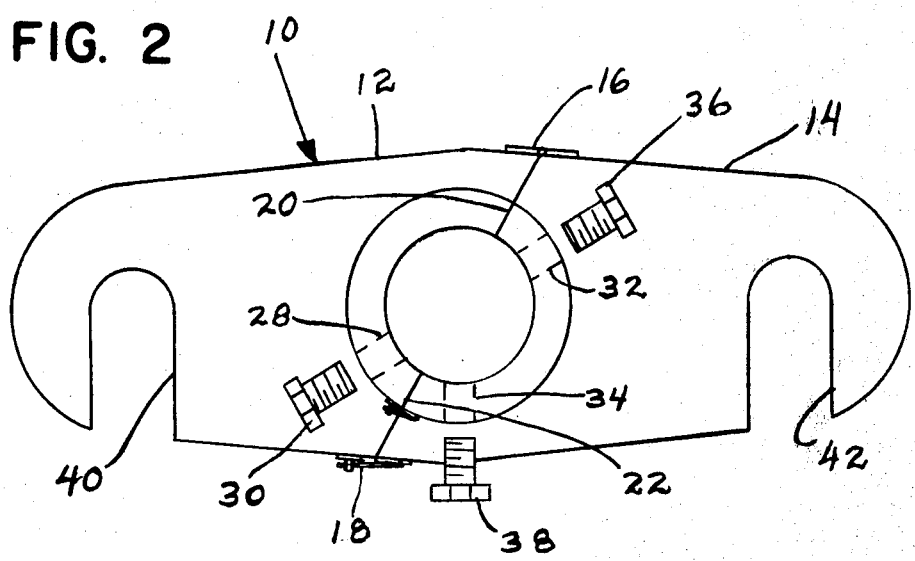
FIG. 2, is a top plan view of the lock.
Figure 3:
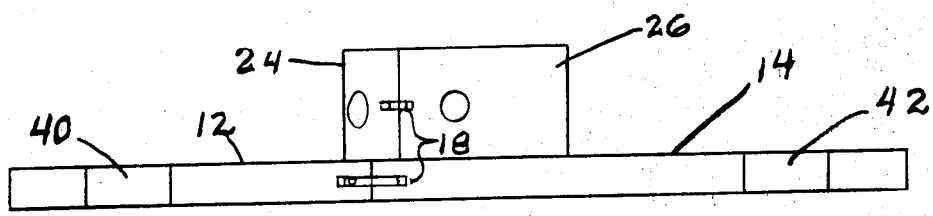
FIG. 3, is a view in front elevation of the lock.

The valve stem lock of this invention is generally identified by the reference numeral 10. It is comprised of a pair of hinged body members 12 and 14 connected by hinge 16 and adapted to be locked by a lock 18. The two body members mate along parting lines 20 and 22, respectively.

The body members 12 and 14 are each provided with upstanding hub portions 24 and 26 having a semi-circular opening. These hub portions are adapted to be interfitted around a valve stem.

In order to provide for locking engagement of the valve stem the portion 12 is provided with a threaded opening 28 receiving an adjustment or locking screw 30. Likewise, the body portion 14 is provided with two threaded openings, 32 and 34, which receive locking screws 36 and 38, respectively.

Locking screws 30 and 36 and 38 may all be made of brass or of another metal or plastic that is softer than the material of the valve stem in order to lock it firmly and not damage any threaded stem portions with which they may be contacted. If desired only the tops of the adjustment screws may be so constructed.

In order to provide a stop for the valve lock and to prevent it from rotating with the rotation of the valve stem cut-out slots 40 and 42 are provided in the valve body members. These cut-out slots are adapted to engage the yoke of the valve or bolt portions of the packing gland on which the valve lock is supported. Thus, when a rotational force is applied against the valve stem the lock as it is locked to it with the slots interfited against the yoke or bolt members on the packing gland prevent rotation and thereby fix and lock the valve stem.

USE

The valve stem of this invention shown in use in FIG. 1, with a conventional valve indicated by the reference numeral 50. This valve is provided with a valve yoke 52, a packing gland 54 and a bushing at the top 56. A lock nut for the bushing 58 is threadedly connected to the structure. A hand wheel 60 is supported on top of the valve. A valve stem 62 extends downwardly and through the yoke and through the packing gland.

When the bushing nut 58 is desired to be removed, the valve stem should be locked in one fashion of another. By means of this invention the valve stem lock provides a very simple means for preventing rotational movement of the valve stem when the bushing nut is removed for any maintenance required for the bushing 56.

In the locking operation of the valve stem the valve lock 10 is unlocked and the two body portions are hinged apart to open them in open-loke jaw fashion. After this has been accomplished, the hub portion of the two hub members 24 and 26 are fitted around the valve stem and the valve lock is supported on top of the packing gland 54. To prevent the rotation of the valve stem when the bushing nut 58 is desired to be removed the lock is moved against the direction of rotation of the valve stem so that either the slot 40 or 42 bears against the yoke 52. It will be understood that for some valve structures the slots may be used to abut and act as stop against either upwardly projecting nuts or bolts of the packing gland, depending upon the valve construction.

After the proper placement of the valve lock has been accomplished as above described, the lock or latch 18 is operated to lock the two body portions together. The locking screws 30, 36 and 38 are then adjusted to bear tightly against the valve stem and lock it to the valve lock. After this has been effected, the valve stem is securely locked and the bushing nut 58 may be removed without relative rotation of the valve stem.

Various changes and modifications may be made within this invention as will be readily apparent to those skilled in the art. Such changes and modifications are within the scope and teaching of this invention as defined by the claims appended hereto.

What is claimed is:

1. A valve stem lock for use with valves having an exposed valve stem situated between a pair of elongated yoke elements, said device comprising a member having a pair of rigid hinged sections having semi-circular valve stem engaging means, said sections being pivotally movable about a first axis from an open position to a closed position surrounding said valve stem, said valve stem engaging means having a second axis parallel to and spaced axially from said first axis, said member being provided with a plurality of radially moveable locking means mounted in semi-circular hub portions provided on each of said hinged sections coaxially with said second axis adapted to engage the valve stem in binding relation and means for engaging said member with the yoke elements, said sections being provided with arcuate slots receivable in said yoke elements and means provided for locking said sections together in the valve stem surrounding position.

2. The lock of claim 1, in which said arcuate slots are positioned on the same side of said hinged sections.

3. The lock of claim 1, in which said radially moveable locking elements are comprised of threaded bolt-like elements receivable in internally threaded holes in said hub portions.

4. The lock of claim 3, in which at least the inner ends of said bolt-like member are of a material softer than the surface of said valve stem to prevent damage to the valve stem.

5. The lock of claim 4, in which at least the inner end of the bolt-like members are brass.

6. A method for locking a valve stem from rotational movement while removing a bushing therefrom comprising positioning a valve stem lock having a pair of rigid hinged sections having semi-circular valve stem engaging means pivotally moveable about a first axis from an open position to a closed position about the valve stem, said valve stem engaging means having a second axis parallel to and spaced axially from said first axis moving said lock to engage a radially extending member with one of a pair of yoke elements provided on said valve in the rotational path of the valve stem, engaging a plurality of radially moveable locking elements mounted in semi-circular hub portions provided on each of said hinged sections coaxially with said second axis in binding relation with the valve stem and rotating the lock before locking to present an arcuate slot provided in the radially extending members into engagement with the yoke element in the path of rotation of the valve stem for firm engagement of the lock with the valve structure.

7. The method of claim 6, in which the valve stem is threaded and the bushing is threaded upon the valve stem and is removed by unscrewing it from its seated relation in the valve and said lock bears against both the valve stem and one of the yoke elements to prevent rotational movement of said valve stem while the bushing is unscrewed.

* * * * *